United States Patent
Hong (10) Patent No.: US 11,310,721 B2
(45) Date of Patent: Apr. 19, 2022

(54) INFORMATION BROADCAST METHOD AND DEVICE, SERVICE IMPLEMENTATION METHOD AND DEVICE, AND ACCESS POINT

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/760,212

(22) PCT Filed: Dec. 7, 2017

(86) PCT No.: PCT/CN2017/114949
§ 371 (c)(1),
(2) Date: Apr. 29, 2020

(87) PCT Pub. No.: WO2019/109288
PCT Pub. Date: Jun. 13, 2019

(65) Prior Publication Data
US 2020/0359300 A1    Nov. 12, 2020

(51) Int. Cl.
*H04W 74/08* (2009.01)
*H04W 48/00* (2009.01)
*H04W 48/10* (2009.01)

(52) U.S. Cl.
CPC .......... *H04W 48/10* (2013.01); *H04W 74/08* (2013.01)

(58) Field of Classification Search
CPC ..... H04W 48/10; H04W 74/08; H04W 72/02; H04W 48/12; H04W 8/183; H04W 28/06
See application file for complete search history.

(56) References Cited

U.S. PATENT DOCUMENTS

| | | | |
|---|---|---|---|
| 10,582,522 B2 * | 3/2020 | Cho | H04W 12/062 |
| 2015/0230247 A1 | 8/2015 | Yang et al. | |
| 2017/0359830 A1 * | 12/2017 | Miyashita | H04W 72/10 |
| 2018/0049108 A1 * | 2/2018 | Yang | H04W 24/08 |

(Continued)

FOREIGN PATENT DOCUMENTS

| | | |
|---|---|---|
| CN | 103731809 A | 4/2014 |
| CN | 103888988 A | 6/2014 |

(Continued)

OTHER PUBLICATIONS

International Search Report in the International Application No. PCT/CN2017/114949, dated Aug. 2, 2018.

(Continued)

*Primary Examiner* — Khawar Iqbal
(74) *Attorney, Agent, or Firm* — Finnegan, Henderson, Farabow, Garrett & Dunner, L.L.P.

(57) ABSTRACT

Involved in the present disclosure are an information broadcast method and device, a service implementation method and device, an access point, a station, and a computer readable storage medium. The information broadcast method includes: receiving parameter information of a current service access type; broadcasting system information carrying the parameter information to a station (STA) so that the STA transmits current service data according to the parameter information. According to embodiments of the present disclosure, by receiving parameter information of a current service access type and broadcasting the system information carrying the parameter information to an STA, the STA can transmit current service data according to the parameter information, so that a current service such as a real-time game can be supported better.

6 Claims, 4 Drawing Sheets

(56) References Cited

U.S. PATENT DOCUMENTS

| | | | |
|---|---|---|---|
| 2018/0049258 A1* | 2/2018 | Kim | H04L 65/1016 |
| 2018/0249479 A1* | 8/2018 | Cho | H04W 12/106 |
| 2018/0310349 A1* | 10/2018 | Wang | H04L 67/2842 |
| 2019/0037409 A1* | 1/2019 | Wang | H04W 8/08 |
| 2019/0082350 A1* | 3/2019 | Kim | H04W 68/02 |
| 2019/0082352 A1* | 3/2019 | Hua | H04W 76/15 |
| 2020/0162995 A1* | 5/2020 | Wei | H04W 48/04 |
| 2020/0267629 A1* | 8/2020 | Van Der Velde | H04W 48/12 |

FOREIGN PATENT DOCUMENTS

| | | |
|---|---|---|
| CN | 103988543 A | 8/2014 |
| CN | 106559904 A | 4/2017 |
| CN | 106817775 A | 6/2017 |
| WO | WO 2008/012789 A1 | 1/2008 |

OTHER PUBLICATIONS

English Translation of the Written Opinion of the International Search Authority in the International Application No. PCT/CN2017/114949, dated Aug. 2, 2018.

First Office Action in Chinese Application No. 201780002432.8, dated Mar. 24, 2020.

Second Office Action of Chinese application No. 201780002432.8, dated Nov. 13, 2020.

* cited by examiner

INFORMATION BROADCAST METHOD AND DEVICE, SERVICE IMPLEMENTATION METHOD AND DEVICE, AND ACCESS POINT

CROSS REFERENCE TO RELATED APPLICATIONS

This application is a national phase application based on PCT/CN2017/114949, filed Dec. 7, 2017, the content of which is incorporated herein by reference.

TECHNICAL FIELD

The disclosure relates to the technical field of communication, and more particularly, to an information broadcast method and device, a service implementation method and device, an access point, a station, and a computer-readable storage medium.

BACKGROUND

With the development of wireless technologies such as a cellular network communication technology and an 802.11 wireless local area networks (WLAN) communication technology, there has been explosive development in mobile games. It is expected that, with the popularization of the $5^{th}$-generation (5G) technology, mobile games will develop more rapidly and diversely. In recent two years, the rise of real-time battle mobile games has brought the development of mobile games into a new growth stage, and a new pattern of nation-wide games and electronic sports is started.

With the continuous growth of electronic sport games, the problem of network instability has become an important factor restricting the development of such games. For the real-time battle games, instant jamming may affect the result of the whole games, especially for electronic sport games in recent years, the stability of wireless networks is more and more important. Problems in the 802.11 networks are more prominent. At the same time, users playing games in the 802.11 networks are large in scale, the using frequency is high, and about 60% of players play games in the 802.11 networks.

Therefore, how to improve the 802.11 networks to better support real-time games is an urgent problem to be solved.

SUMMARY

Accordingly, the application discloses an information broadcast method and device, a service implementation method and device, an access point, a station, and a computer-readable storage medium to better support a current service such as real-time games.

According to a first aspect of embodiments of the disclosure, an information broadcast method is provided. The method is applied to an access point (AP). The method includes:

receiving parameter information of a current service access category; and broadcasting system information including the parameter information to a station (STA) to enable the STA to transmit current service data according to the parameter information.

In an embodiment, the broadcasting the system information including the parameter information to the STA may include:

broadcasting the system information including the parameter information to the STA through a beacon.

In an embodiment, a service type mapping table stored in the AP may include a mapping relationship between a current service type and a current service priority, and a service category mapping table stored in the AP may include a mapping relationship between the current service priority and the current service access category.

In an embodiment, the parameter information may include at least one of: a size of a contention window, or a transmission duration.

According to a second aspect of embodiments of the disclosure, a service implementation method is provided. The method is applied to a station (STA). The method includes:

receiving system information, broadcast by an access point (AP), including parameter information of a current service access category;

obtaining the parameter information after parsing the system information; and contending for transmission resources according to the parameter information, and transmitting current service data by using the contended transmission resources.

In an embodiment, a service type mapping table stored in the STA may include a mapping relationship between a current service type and a current service priority, and a service category mapping table stored in the STA may include a mapping relationship between the current service priority and the current service access category.

In an embodiment, the parameter information may include at least one of: a size of a contention window, or a transmission duration.

According to a third aspect of embodiments of the disclosure, an information broadcast device is provided. The device is applied to an access point (AP). The device includes:

a receiving module, configured to receive parameter information of a current service access category; and a sending module, configured to broadcast system information including the parameter information received by the receiving module to a station (STA) to enable the STA to transmit current service data according to the parameter information.

In an embodiment, the sending module may be configured to:

broadcast the system information including the parameter information to the STA through a beacon.

In an embodiment, a service type mapping table stored in the AP may include a mapping relationship between a current service type and a current service priority, and a service category mapping table stored in the AP may include a mapping relationship between the current service priority and the current service access category.

In an embodiment, the parameter information may include at least one of: a size of a contention window, or a transmission duration.

According to a fourth aspect of embodiments of the disclosure, a service implementation device is provided. The device is applied to a station (STA). The device includes:

a receiving module, configured to receive system information, broadcast by an access point (AP), including parameter information of a current service access category;

a parsing module, configured to obtain the parameter information after parsing the system information received by the receiving module; and a contending and transmitting module, configured to contend for transmission resources according to the parameter information parsed and obtained by the parsing module, and transmit current service data by using the contended transmission resources.

In an embodiment, a service type mapping table stored in the STA may include a mapping relationship between a current service type and a current service priority, and a service category mapping table stored in the STA may include a mapping relationship between the current service priority and the current service access category.

In an embodiment, the parameter information may include at least one of: a size of a contention window, or a transmission duration.

According to a fifth aspect of embodiments of the disclosure, an access point (AP) is provided. The AP includes:

a processor; and a memory configured to store instructions executable by the processor.

The processor is configured to:

receive parameter information of a current service access category; and broadcast system information including the parameter information to a station (STA) to enable the STA to transmit current service data according to the parameter information.

According to a sixth aspect of embodiments of the disclosure, a station is provided. The station includes:

a processor; and a memory configured to store instructions executable by the processor.

The processor is configured to:

receive system information, broadcast by an access point (AP), including parameter information of a current service access category;

obtain the parameter information after parsing the system information; and contend for transmission resources according to the parameter information, and transmitting current service data by using the contended transmission resources.

According to a seventh aspect of embodiments of the disclosure, there is provided a computer-readable storage medium having computer instructions stored thereon. The instructions are executed by a processor to implement the steps of the above information broadcast methods.

According to an eighth aspect of embodiments of the disclosure, there is provided a computer-readable storage medium having computer instructions stored thereon. The instructions are executed by a processor to implement the steps of the above service implementation methods.

The technical solutions in the embodiments of the disclosure may include the following beneficial effects.

By receiving parameter information of a current service access category and broadcasting system information including the parameter information to a station (STA), the STA may transmit current service data according to the parameter information so as to better support a current service such as a real-time game.

By receiving the system information, broadcast by an access point (AP), including the parameter information of the current service access category, obtaining the parameter information after parsing the system information, contending for transmission resources according to the parameter information, and transmitting current service data by using the contended transmission resources, the current service such as the real-time game is supported better.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the disclosure and, together with the specification, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
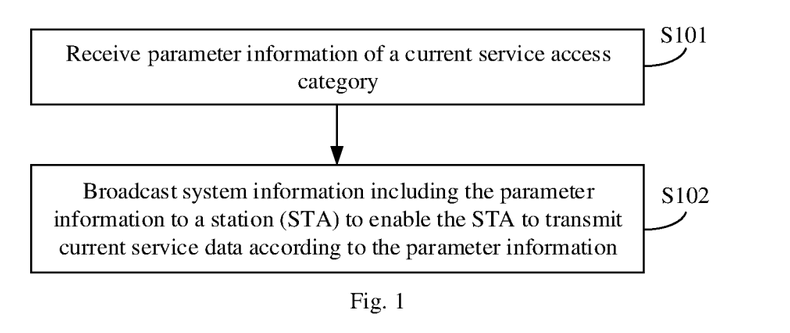
FIG. 1 is a flow chart showing an information broadcast method, according to an exemplary embodiment of the disclosure.

FIG. 1 is a flow chart showing an information broadcast method, according to an exemplary embodiment of the disclosure. The embodiment is described based on an access point (AP) side. As illustrated in FIG. 1, the information broadcast method includes the following steps.

In step S101, parameter information of a current service access category is received.

A current service may include, but is not limited to, a real-time game. If the current service is the real-time game, the current service access category is a real-time game access category, and the parameter information of the current service access category may include, but is not limited to, at least one of: a size of a contention window, or a transmission duration.

In the embodiment, before performing the step S101, a service type mapping table stored in the AP includes a mapping relationship between a current service type and a current service priority, and a service category mapping table stored in the AP includes a mapping relationship between the current service priority and the current service access category. The real-time game is taken as an example as follows, and an implementation process thereof is described.

Engineers may define a new service type in an application layer protocol such as an IEEE 802.1D protocol: real-time game/real-time gaming (RG), with corresponding features of transmission of large data volume and low latency. The new service type is added into the service type mapping table in a variety of ways, for example, the new service type may be added by using unused field contents into an original service type mapping table, such as unused content of user priority (UP) as 2 in Table 1, and an RG service type and UP2 may be then added to Table 1 to form a new Table 2. For example, field contents in the original service type mapping table may be extended, such as nonexistent content of UP as 8 in Table 1, and the RG service type and UP8 may be added to Table 1 to form a new Table 3.

It should be noted that the above addition ways are merely examples, and addition may be performed in other ways in practical applications.

TABLE 1

Original Service Type Mapping Table

| User Priority (UP) | Acronym of service type | Service type/Traffic type |
|---|---|---|
| 1 | BK | Background |
| 0 (Default) | BE | Best Effort |
| 3 | EE | Excellent Effort |
| 4 | CL | Controlled Load |
| 5 | VI | "Video" less than 100 ms latency and jitter |
| 6 | VO | "Voice" less than 10 ms latency and jitter |
| 7 | NC | "Network Control" |

TABLE 2

Service Type Mapping Table After Addition

| User Priority (UP) | Acronym of service type | Service type/Traffic type |
|---|---|---|
| 1 | BK | Background |
| 2 | RG | Real-time Gaming |
| 0 (Default) | BE | Best Effort |
| 3 | EE | Excellent Effort |
| 4 | CL | Controlled Load |
| 5 | VI | "Video" less than 100 ms latency and jitter |
| 6 | VO | "Voice" less than 10 ms latency and jitter |
| 7 | NC | Network Control |

TABLE 3

Service Type Mapping Table After Addition

| User Priority (UP) | Acronym of service type | Service type/Traffic type |
|---|---|---|
| 1 | BK | Background |
| 0 (Default) | BE | Best Effort |
| 3 | EE | Excellent Effort |
| 4 | CL | Controlled Load |
| 5 | VI | "Video" less than 100 ms latency and jitter |
| 6 | VO | "Voice" less than 10 ms latency and jitter |
| 7 | NC | Network Control |
| 8 | RG | Real-time Gaming |

The engineers may then add a mapping relationship between a current service priority and a current service access category (AC), namely AC_RG, into a service category mapping table corresponding to an IEEE 802.11 protocol, and add a mapping relationship between UP2 and AC_RG into the service category mapping table as illustrated in Table 4.

TABLE 4

Service Category Mapping Table

| Priority | User Priority (UP) | Designation in IEEE 802.1D | AC | Transmit queue | Transmit queue | Designation |
|---|---|---|---|---|---|---|
| Lowest | 1 | BK | AC_BK | BK | BK | Background |
|  | 2 | RG | AC_RG | RG | RG | Real-time Gaming |
| Highest | 0 | BE | AC_BE | BE | BE | Best Effort |
|  | 3 | EE | AC_BE | BE | BE | Best Effort |
|  | 4 | CL | AC_VI | VI | A_VI | Video (alternate) |
|  | 5 | VI | AC_VI | VI | VI | Video (primary) |
|  | 6 | VO | AC_VO | VO | VO | Voice (primary) |
|  | 7 | NC | AC_VO | VO | A_VO | Voice (alternate) |

Thereafter, the engineers may add parameter information of the AC_RG into an enhanced distributed channel access (EDCA) parameter set element, as illustrated in Table 5, i.e., the AP receives the parameter information of the current service access category, such as the parameter information of the AC_RG.

TABLE 5

EDCA Parameter Set Element

| Element Identification (ID) | Length | Quality of service(Qos) Information(info) | AC_RG parameter Record | AC_BE parameter Record | AC_BK parameter Record | AC_VI parameter Record | AC_VO parameter Record |
|---|---|---|---|---|---|---|---|

In step S102, system information including the parameter information is broadcast to a station (STA) to enable the STA to transmit current service data according to the parameter information.

The AP may broadcast the system information including the parameter information to the STA through a beacon, and the STA may obtain the parameter information after receiving and parsing the system information, contend for transmission resources according to the parameter information, and transmit the current service data by using the contended transmission resources.

According to the above embodiment, by receiving the parameter information of the current service access category and broadcasting the system information including the parameter information to the STA, the STA may transmit the current service data according to the parameter information so as to better support the current service such as the real-time game.

Figure 2:
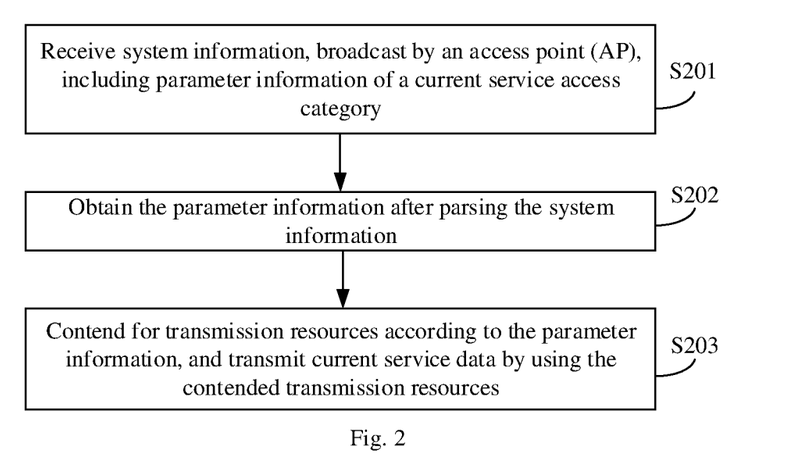
FIG. 2 is a flow chart showing a service implementation method, according to an exemplary embodiment of the disclosure.

FIG. 2 is a flow chart showing a service implementation method, according to an exemplary embodiment of the disclosure. The embodiment is described based on a station (STA) side. As illustrated in FIG. 2, the method includes the following steps.

In step S201, system information, broadcast by an access point (AP), including parameter information of a current service access category is received.

A current service may include, but is not limited to, a real-time game. If the current service is the real-time game, the current service access category is a real-time game access category, and the parameter information of the current service access category may include, but is not limited to, at least one of: a size of a contention window, or a transmission duration.

In step S202, the parameter information is obtained after/by parsing the system information.

Since a service type mapping table stored in the STA includes a mapping relationship between a current service type and a current service priority and a service category mapping table stored in the STA includes a mapping relationship between the current service priority and the current service access category, the STA may obtain the parameter information after receiving and parsing the system information.

In step S203, transmission resources are contended for according to the parameter information, and current service data are transmitted by using the contended transmission resources.

In the embodiment, the STA may contend for the transmission resources according to the parameter information, for example by using a 5 ms contention window to contend for the transmission resources, and transmit the current service data by using the contended transmission resources.

According to the above embodiment, by receiving the system information, broadcast by the AP, including the parameter information of the current service access category, obtaining the parameter information after parsing the system information, contending for the transmission resources according to the parameter information, and transmitting the current service data by using the contended transmission resources, the current service such as the real-time game is supported better.

Figure 3:
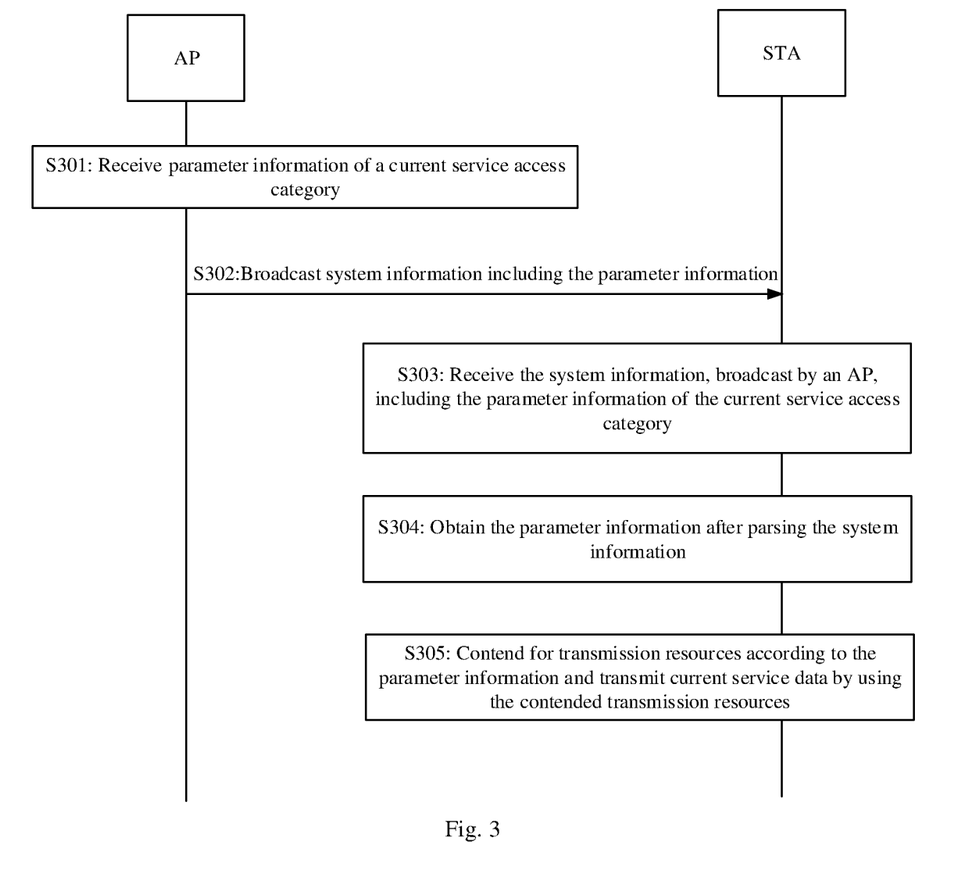
FIG. 3 is a signaling flow chart showing a service implementation method, according to an exemplary embodiment of the disclosure.

FIG. 3 is a signaling flow chart showing a service implementation method, according to an exemplary embodiment of the disclosure. The embodiment is described based on the angle of interaction between an access point (AP) and a station (STA). As illustrated in FIG. 3, the method includes the following steps.

In step S301, the AP receives parameter information of a current service access category.

In step S302, the AP broadcasts system information including the parameter information to the STA.

In step S303, the STA receives the system information, broadcast by the AP, including the parameter information of the current service access category.

In step S304, the STA obtains the parameter information after parsing the system information.

In step S305, the STA contends for transmission resources according to the parameter information, and transmits current service data by using the contended transmission resources.

According to the above embodiment, through interaction between the AP and the STA, the STA may receive the system information, broadcast by the AP, including the parameter information of the current service access category, obtain the parameter information after parsing the system information, contend for the transmission resources according to the parameter information, and transmit the current service data by using the contended transmission resources, so that a current service such as a real-time game is supported better.

Figure 4:
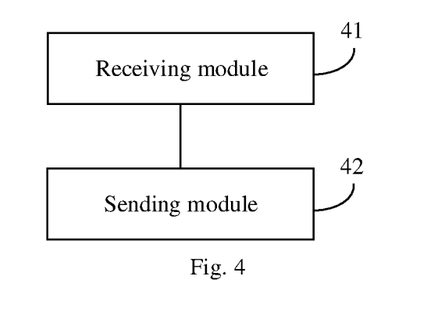
FIG. 4 is a block diagram illustrating an information broadcast device, according to an exemplary embodiment.

FIG. 4 is a block diagram illustrating an information broadcast device, according to an exemplary embodiment. The information broadcast device may be in an access point (AP). As illustrated in FIG. 4, the device includes: a receiving module 41 and a sending module 42.

The receiving module 41 is configured to receive parameter information of a current service access category.

A current service may include, but is not limited to, a real-time game. If the current service is the real-time game, the current service access category is a real-time game access category, and the parameter information of the current service access category may include, but is not limited to, at least one of: a size of a contention window, or a transmission duration.

In the embodiment, a service type mapping table stored in the AP includes a mapping relationship between a current service type and a current service priority, and a service category mapping table stored in the AP includes a mapping relationship between the current service priority and the current service access category. The real-time game is taken as an example as follows, and an implementation process thereof is described.

Engineers may define a new service type in an application layer protocol such as an IEEE 802.1D protocol: real-time game/real-time gaming (RG), with corresponding features of transmission of large data volume and low latency. The new service type is added into the service type mapping table in a variety of ways, for example, the new service type may be added by using unused field contents into an original service type mapping table, such as unused content of user priority (UP) as 2 in Table 1, and an RG service type and UP2 may be then added to Table 1 to form a new Table 2. For example, field contents in the original service type mapping table may be extended, such as nonexistent content of UP as 8 in Table 1, and the RG service type and UP8 may be added to Table 1 to form a new Table 3. It should be noted that the above addition ways are merely examples, and addition may be performed in other ways in practical applications.

The engineers may then add a mapping relationship between a current service priority and a current service access category (AC), namely AC_RG, into a service category mapping table corresponding to an IEEE 802.11 protocol, and add a mapping relationship between UP2 and AC_RG into the service category mapping table as illustrated in Table 4.

Thereafter, the engineers may add parameter information of the AC_RG into an enhanced distributed channel access (EDCA) parameter set element, as illustrated in Table 5, i.e., the AP receives the parameter information of the current service access category, such as the parameter information of the AC_RG.

The sending module 42 is configured to broadcast the system information including the parameter information received by the receiving module 41 to a station (STA) to enable the STA to transmit current service data according to the parameter information.

The sending module 42 may broadcast the system information including the parameter information to the STA through a beacon, and the STA may obtain the parameter information thereof after receiving and parsing the system information, contend for transmission resources according to the parameter information, and transmit the current service data by using the contended transmission resources.

According to the above embodiment, by receiving the parameter information of the current service access category and broadcasting the system information including the parameter information to the STA, the STA may transmit the current service data according to the parameter information so as to better support the current service such as the real-time game.

Figure 5:
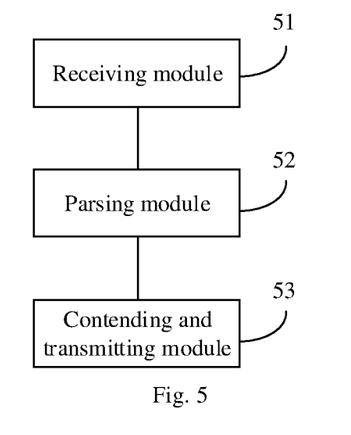
FIG. 5 is a block diagram illustrating a service implementation device, according to an exemplary embodiment.

FIG. 5 is a block diagram illustrating a service implementation device, according to an exemplary embodiment. The service implementation device may be in a station (STA). As illustrated in FIG. 5, the device includes: a receiving module 51, a parsing module 52 and a contending and transmitting module 53.

The receiving module 51 is configured to receive system information, broadcast by an access point (AP), including parameter information of a current service access category.

A current service may include, but is not limited to, a real-time game. If the current service is the real-time game, the current service access category is a real-time game access category, and the parameter information of the current service access category may include, but is not limited to, at least one of: a size of a contention window, or a transmission duration.

The parsing module 52 is configured to obtain the parameter information after parsing the system information received by the receiving module 51.

Since a service type mapping table stored in the STA includes a mapping relationship between a current service type and a current service priority and a service category mapping table stored in the STA includes a mapping relationship between the current service priority and the current service access category, the STA may obtain the parameter information after receiving and parsing the system information.

The contending and transmitting module 53 is configured to contend for transmission resources according to the parameter information parsed and obtained by the parsing module 52, and transmit current service data by using the contended transmission resources.

In the embodiment, the STA may contend for the transmission resources according to the parameter information, for example by using a 5 ms contention window to contend for the transmission resources, and transmit the current service data by using the contended transmission resources.

According to the above embodiment, by receiving the system information, broadcast by the AP, including the parameter information of the current service access category, obtaining the parameter information after parsing the system information, contending for the transmission resources according to the parameter information, and transmitting the current service data by using the contended transmission resources, the current service such as the real-time game is supported better.

Figure 6:
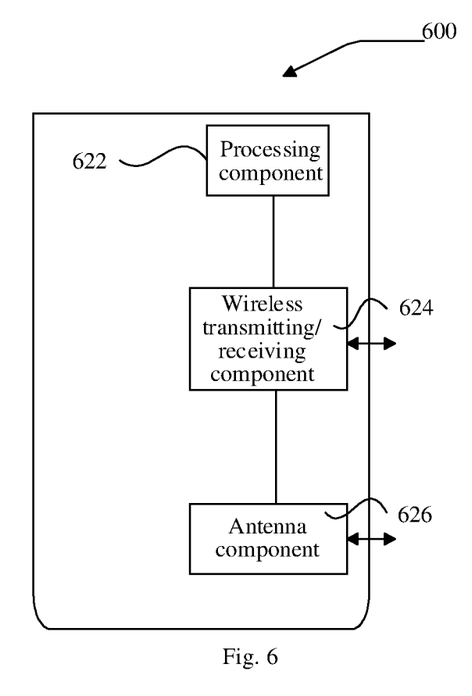
FIG. 6 is a block diagram for an information broadcast device, according to an exemplary embodiment.

FIG. 6 is a block diagram for an information broadcast device, according to an exemplary embodiment. The device 600 may be provided as an access point (AP). Referring to FIG. 6, the device 600 includes a processing component 622, a wireless transmitting/receiving component 624, an antenna component 626 and a specific signal processing part of a wireless interface; and the processing component 622 may further include one or more processors.

One processor of the processing component 622 may be configured to:

receive parameter information of a current service access category; and broadcast system information including the parameter information to a station (STA) to enable the STA to transmit current service data according to the parameter information.

In the exemplary embodiment, a non-transitory computer-readable storage medium including instructions is further provided, and the above instructions may be executed by the processing component 622 of the device 600 to implement the above information broadcast methods. For example, the non-transitory computer-readable storage medium may be a read only memory (ROM), a random access memory (RAM), a CD-ROM, a magnetic tape, a floppy disc, an optical data storage device, and the like.

Figure 7:
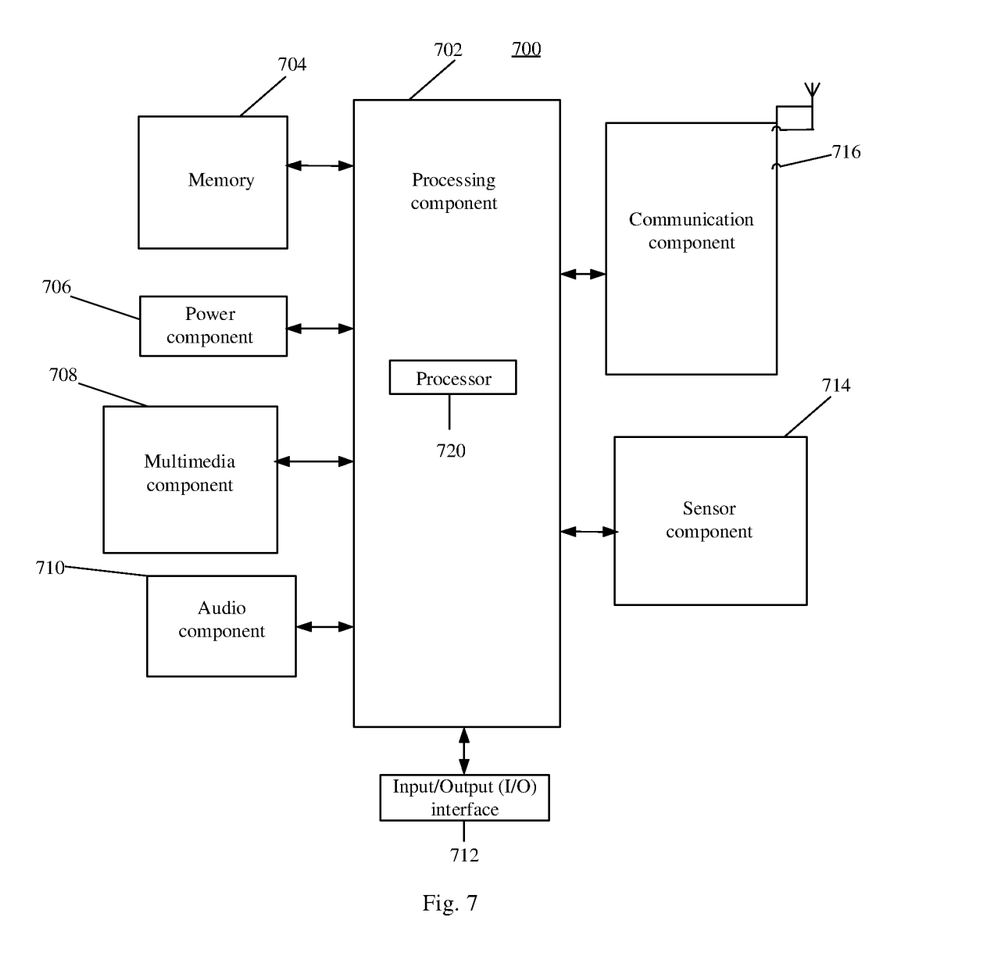
FIG. 7 is a block diagram for a service implementation device, according to an exemplary embodiment.

FIG. 7 is a block diagram for a service implementation device, according to an exemplary embodiment. For example, the device 700 may be terminal devices such as a mobile phone, a computer, a digital broadcast terminal, a messaging device, a gaming console, a tablet, a medical device, exercise equipment, a personal digital assistant, and the like.

Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For example, the processing component 702 may include a multimedia module to facilitate interaction between the multimedia component 708 and the processing component 702.

One processor 720 of the processing component 702 may be configured to:

receive system information, broadcast by an access point (AP), including parameter information of a current service access category;

obtain the parameter information after parsing the system information; and contend for transmission resources according to the parameter information, and transmit current service data by using the contended transmission resources.

The memory 704 is configured to store various types of data to support the operations of the device 700. Examples of such data include instructions for any applications or methods operated on the device 700, contact data, phonebook data, messages, pictures, video, etc. The memory 704 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management and distribution of power in the device 700.

The multimedia component 708 includes a screen providing an output interface between the device 700 and a user. In some embodiments, the screen may include a liquid crystal display (LCD) and a touch panel (TP). If the screen includes the TP, the screen may be implemented as a touch screen to receive input signals from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 708 includes a front camera and/or a rear camera. The front camera and/or the rear camera may receive external multimedia data while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For example, the sensor component 714 may detect an on/off status of the device 700, and relative positioning of components, e.g., a display and a keypad of the device 700. The sensor component 714 may also detect a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a complementary metal oxide semiconductor (CMOS) or charge coupled device (CCD) image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 may access a wireless network based on a communication standard, such as WiFi, 2G or 3G, or a combination thereof. In one exemplary embodiment, the communication component 716 receives a broadcast signal or broadcast associated information from an external broadcast management system via a broadcast channel In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described service implementation method.

In exemplary embodiments, there is also provided a non-transitory computer-readable storage medium including instructions, such as included in the memory 704, executable by the processor 720 in the device 700, for performing the methods. For example, the non-transitory computer-readable storage medium may be a ROM, a random access memory (RAM), a compact disc read-only memory (CD-ROM), a magnetic tape, a floppy disc, an optical data storage device, and the like.

The device embodiments substantially correspond to the method embodiments, and thus related parts refer to part of descriptions of the method embodiments. The device embodiment described above is only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the embodiments. Those of ordinary skill in the art may understand and implement without creative work.

It is to be noted that relational terms "first", "second" and the like in the present disclosure are adopted only to distinguish one entity or operation from another entity or operation and not always to require or imply existence of any such practical relationship or sequence between the entities or operations. Terms "include" and "have" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an" does not exclude existence of another element that is the same in a process, method, object or device including the element.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An information broadcast method, applied to an access point (AP), comprising:
   receiving parameter information of a current service access category; and
   broadcasting system information including the parameter information to a station (STA) to enable the STA to transmit current service data according to the parameter information, the parameter information being included in a service type mapping table and a service category mapping table,
   wherein the AP stores the service type mapping table and the service category mapping table, the service type mapping table comprising: a current service priority, a current service type, an acronym of the current service type, and a mapping relationship between the current service type and the current service priority, and the service category mapping table comprising: the current service priority, the current service access category, transmit queues, designations, and a mapping relationship between the current service priority and the current service access category.

2. The method of claim 1, wherein the broadcasting the system information including the parameter information to the STA comprises:
   broadcasting the system information including the parameter information to the STA through a beacon.

3. The method of claim 1, wherein the parameter information comprises at least one of: a size of a contention window, or a transmission duration.

4. An access point (AP), comprising:
   a processor; and
   a memory storing instructions executable by the processor,
   wherein the processor is configured to:
   receive parameter information of a current service access category; and
   broadcast system information including the parameter information to a station (STA) to enable the STA to transmit current service data according to the parameter information, the parameter information being included in a service type mapping table and a service category mapping table,
   wherein the AP stores the service type mapping table and the service category mapping table, the service type mapping table comprising: a current service priority, a current service type, an acronym of the current service type, and a mapping relationship between the current service type and the current service priority, and the service category mapping table comprising: the current service priority, the current service access category, transmit queues, designations, and a mapping relationship between the current service priority and the current service access category.

5. The AP of claim 4, wherein the processor is further configured to:
   broadcast the system information including the parameter information to the STA through a beacon.

6. The AP of claim 4, wherein the parameter information comprises at least one of: a size of a contention window, or a transmission duration.

* * * * *